(12) United States Patent     (10) Patent No.: US 12,325,003 B2
Claxton et al.     (45) Date of Patent: Jun. 10, 2025

(54) EXHAUST GAS TREATMENT SYSTEM

(71) Applicant: Johnson Matthey Public Limited Company, London (GB)

(72) Inventors: Henry Arthur Claxton, London (GB); Olivier Leroux, Royston (GB); Andrew Scullard, Reading (GB); Thomas Manning Yeh, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 808 days.

(21) Appl. No.: 17/444,623

(22) Filed: Aug. 6, 2021

(65) Prior Publication Data

US 2022/0040628 A1     Feb. 10, 2022

Related U.S. Application Data

(60) Provisional application No. 62/706,325, filed on Aug. 10, 2020.

(30) Foreign Application Priority Data

Oct. 7, 2020    (EP) ..................................... 20200541

(51) Int. Cl.
    *B01D 53/06*        (2006.01)
    *A01K 1/00*         (2006.01)
    *B01D 53/86*        (2006.01)

(52) U.S. Cl.
    CPC ............ *B01D 53/06* (2013.01); *A01K 1/0076* (2013.01); *B01D 53/8634* (2013.01);
(Continued)

(58) Field of Classification Search
None
See application file for complete search history.

(56) References Cited

FOREIGN PATENT DOCUMENTS

DE     202006002505 U1    12/1899
EP          0638350 A2     2/1995
(Continued)

OTHER PUBLICATIONS

Lenntech-Substances removal by Zeolites. Water Treatment Solutions. [online] [retrieved on May 14, 2024]. pp. 1-2. https://www.lenntech.com/zeolites-removal.htm (Year: 2012).*
(Continued)

*Primary Examiner* — Jelitza M Perez
(74) *Attorney, Agent, or Firm* — BakerHostetler

(57) ABSTRACT

The invention relates to an exhaust system for the treatment of an exhaust gas comprising ammonia in an amount of up to 250 ppm, the system comprising: an exhaust gas inlet; an ammonia storage material arranged to receive an exhaust gas from the exhaust gas inlet; an ammonia oxidation catalyst arranged downstream of a selected portion of the ammonia storage material; and a heating device for heating gas before it passes through the selected portion of the ammonia storage material to release ammonia stored therein for treatment on the ammonia oxidation catalyst, wherein the system is configured so that the selected portion of the ammonia storage material changes over time. The invention further relates to a livestock house comprising the exhaust system and a method of treating an ammonia-containing gas.

26 Claims, 1 Drawing Sheet

(52) U.S. Cl.
CPC .. *B01D 2253/102* (2013.01); *B01D 2253/108* (2013.01); *B01D 2253/304* (2013.01); *B01D 2257/304* (2013.01); *B01D 2257/406* (2013.01); *B01D 2257/55* (2013.01); *B01D 2259/4009* (2013.01)

(56) References Cited

FOREIGN PATENT DOCUMENTS

| | | | | |
|---|---|---|---|---|
| EP | 1195195 | A1 | 4/2002 | |
| EP | 1930065 | A2 * | 6/2008 | ............ B01D 53/06 |
| JP | H09314116 | A | 12/1997 | |
| JP | 2001286751 | A | 10/2001 | |
| KR | 20120082163 | A | 7/2012 | |
| KR | 20130052392 | A | 5/2013 | |
| KR | 20160140533 | A * | 12/2016 | |
| KR | 20180035351 | A * | 4/2018 | ......... B01D 53/0407 |

OTHER PUBLICATIONS

Lee et al. KR20160140533A—translated document (Year: 2016).*
Choi et al. KR20180035351A-translated document (Year: 2018).*
Busca, G.: Abatement of Ammonia Amines From Waste Gases: a Summary, Journal of loss prevention in the process industries, vol. 16, No. 2, Feb. 11, 2003, pp. 157-163.
Van De Heyden, Caroline et al, Migrating Emissions From Pig and Poultry Housing Facilities Through Air Scrubbers and Biofilters: State-Of-The-Art and Prespectives, Biosystems Engineering, Elsevier, Amsterdam, NL, vol. 134, Apr. 25, 2025, pp. 74-93.

* cited by examiner

EXHAUST GAS TREATMENT SYSTEM

The present invention relates to a system and method for the treatment of an exhaust gas and, in particular, for the treatment of an exhaust gas comprising relatively low concentrations of ammonia which need to be treated. The system is particularly useful for treating emissions of ammonia produced from livestock houses which are at low and variable concentrations.

Animals are often reared in a relatively small space such as a barn, coop, or shed (generally "house"). This confined space can potentially lead to undesirably high concentrations of pollutants in the contained gas atmosphere of a space housing livestock. Typical pollutants include $NH_3$, VOCs, methane, HS, bioaerosols such as organic or inorganic particulates which can arise from feed and manure particles and may include bacteria, and the like. Therefore, air quality within the barn is a concern for both animal and workers health. Furthermore, emissions ventilated to the outside can cause problems and may be subject to emissions limits.

For example in poultry rearing, it is required that $NH_3$ should be limited in the poultry breathing air to 25 ppm (OSHA in the US). While this is attainable, concentrations as high as 50-200 ppm are also known. Emissions typically are not constant and increase with number, age and activity of the animals (VDI 4255 part 2).

For animal breeding, the air exchange rate in the barn/house depends on the outside temperatures. In summer exchange rates may be high, whereas in colder whether it typically is very low to avoid generating too much of a draft, which can impact animal health. A low air exchange rate worsens the pollutant concentrations in the air which the animals/workers breath.

There is a particular focus at the moment on decreasing the pollutant concentrations inside of the barn and also emission to the outside. The current state-of-the-art to minimise these organic and inorganic air pollutants relies on scrubber and biofilter systems which have an associated high investment cost. In operation a relatively high volume of fresh water is used and therefore a high volume of organically-polluted grey water is attained.

CN11113567 describes a rotating bed of sorbent material so as to better saturate the entirety of the bed without wasting unused sorbent. Once the sorbent material is saturated it is discarded and replaced.

EP 2581127 A1 relates to a method of air purification whereby pollutants, preferably VOCs, are broken down by means of UV radiation, preferably by means of photooxidation and residual pollutants may be oxidised by a catalytic converter.

EP 1930065 relates to a treatment assembly for VOC gases including two or more treatment units.

KR 20180035351 relates to an ammonia removal apparatus and method.

DE 202006002505 relates to a compact system for cleaning VOC-contaminated exhaust air streams, the application of which is suitable for both low and high emission concentrations.

KR 20130052393 relates to an energy-saving volatile organic compound removal device and volatile organic compound removal method using the same.

KR 20120082163 relates to a method for treating waste gas simultaneously containing odours and contaminants such as volatile organic compounds.

Accordingly, it is desirable to provide an improved system and method for treating such exhaust gases and/or to tackle at least some of the problems associated with the prior art or, at least, to provide a commercially viable alternative thereto. In particular, it is an aim to achieve catalytic destruction of ammonia directly in the gas phase for recirculation of the air back to the inside or venting to the outside.

According to a first aspect there is provided an exhaust system for the treatment of an exhaust gas comprising ammonia in an amount of up to 250 ppm, the system comprising:
an exhaust gas inlet;
an ammonia storage material arranged to receive an exhaust gas from the exhaust gas inlet;
an ammonia oxidation catalyst arranged downstream of a selected portion of the ammonia storage material; and
a heating device for heating gas before it passes through the selected portion of the ammonia storage material to release ammonia stored therein for treatment on the ammonia oxidation catalyst,
wherein the system is configured so that the selected portion of the ammonia storage material changes over time.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The following discussion focuses in particular on the treatment of ammonia from poultry houses (including chicken sheds), but it should be appreciated that the invention applies equally to other livestock environments (such as swine houses) and to other situations where low concentrations of ammonia need to be treated.

The present invention allows for the direct catalytic treatment of ammonia in the gas phase. In particular, the invention provides for treatment of ammonia in low concentrations and at low temperature directly in the gas phase without the use of a liquid phase like in scrubber or biofilter systems. The low temperature catalytic gas treatment system can operate with only electrical power for fans and gas heaters and does not have any constantly-incurred by-products except for spent sorbent material or catalyst.

Direct treatment of a low temperature exhaust gas with a catalyst tends to have a low conversion efficiency. Known catalysts tend to operate more effectively at temperatures well above ambient. To make the input of energy to heat the exhaust gas efficient, it is not desirable to treat large volumes of exhaust gases with low ammonia concentration levels. The inventors have now found that the system and method described herein overcome these problems. In particular, the concentration of the ammonia to be treated can be significantly increased so that the heated catalyst is only required to treat a smaller volume of contaminant-rich exhaust gas.

The inventors have found that they can apply technologies generally used in the automobile exhaust field, such as ammonia oxidation catalysts and ammonia storage beds, to treat low level exhaust concentrations. This system is particularly advantageous for treating gases which are provided at low temperatures (such as at or around ambient) and at low concentrations (even down to 10s of ppm). Since existing known components can be used which are already available on a mass-production scale, the production costs of the system described herein can be significantly reduced.

Moreover, the system permits a continuous flow of ammonia to be treated on a catalyst, despite the natural variance in the levels which are being produced.

The present invention relates to an exhaust system for the treatment of an exhaust gas comprising ammonia. An exhaust gas is a gas to be emitted or discharged. In the context of the present invention, the exhaust gas is a gas containing a build-up of ammonia which needs to be treated to ensure that emissions limits are met, or to ensure that an internal environment is kept at tolerable levels in view of health and safety considerations. In the context of a livestock house (for example, a poultry house or a swine house), the exhaust gas is the air within the house which contains ammonia produced by animals, which is taken out of the house to be processed within the exhaust gas system described herein, either to be emitted to the outside or recycled into the house atmosphere.

The exhaust system is for the treatment of an exhaust gas comprising ammonia in an amount of up to 250 ppm. Preferably the exhaust gas comprises from 1 to 50 ppm ammonia, preferably 5 to 30 ppm and most preferably 10 to 25 ppm ammonia. That is, the system is preferably for the treatment of an exhaust gas comprising ammonia in such amounts. As noted above, ammonia levels in poultry houses are limited to not exceeding 20 ppm, so the gas exhausted from such houses will have less than 20 ppm ammonia which needs to be treated. The present device and apparatus provide an efficient approach to treating such low levels of ammonia.

The ppm concentrations of the ammonia will of course fluctuate because of the natural source of the ammonia. The above ranges for concentrations are the average concentrations over the operating period of the exhaust gas system, excluding any start-up or warm-up period required for the system.

Preferably the system comprises one or more fans to push or pull gases through the system. The configuration of such a fan will depend on the desired air exchange rate required in the atmosphere to be treated. Advantageously the entire system can be driven by a single fan.

The system comprises an exhaust gas inlet. This will be the air-intake for providing a flow of exhaust gas (source gas). The gas inlet provides the exhaust gas to be treated. The exhaust gas is taken from an atmosphere containing ammonia to be treated, such as a livestock house atmosphere. The exhaust gas may be drawn into the inlet with a fan, and typically involves a conventional air intake within, for example, a livestock house air handling system.

The exhaust gas inlet will provide gas at the ambient temperature of the source gas. In the context of a livestock house, this will typically be from 10 to 40° C. Preferably the exhaust gas entering the system is at ambient temperature. Preferably the exhaust gas will be at 5 to 60° C., preferably at 5 to 50° C., more preferably 10 to 40° C. and most preferably 20 to 30° C. The temperature of the ambient air in the house may be controlled with heating and/or cooling. In general, for certain animals it may not be necessary to provide heating in winter.

The system comprises an ammonia storage material arranged to receive an exhaust gas from the exhaust gas inlet. Preferably the ammonia storage material comprises a zeolite or activated carbon, such as activated charcoal. Suitable ammonia storage materials are well known in the field of automobile exhaust gas treatment systems.

Zeolites are constructed of repeating $SiO_4$, $AlO_4$, tetrahedral units linked together, for example in rings, to form frameworks having regular intra-crystalline cavities and channels of molecular dimensions. The specific arrangement of tetrahedral units (ring members) gives rise to the zeolite's framework, and by convention, each unique framework is assigned a unique three-letter code (e.g., "CHA") by the International Zeolite Association (IZA). Zeolites may also be categorised by pore size, e.g. a maximum number of tetrahedral atoms present in a zeolite's framework. As defined herein, a "small pore" molecular sieve, such as CHA, contains a maximum ring size of eight tetrahedral atoms, whereas a "medium pore" molecular sieve, e.g. MFI, contains a maximum ring size of ten tetrahedral atoms; and a "large pore" molecular sieve, such as BEA, contains a maximum ring size of twelve tetrahedral atoms.

A most preferred zeolite for the storage of ammonia is a small-pore zeolite. Small pore zeolites are more selective for ammonia and so may reduce competition for ammonia storage when other gaseous species are present. Preferably the small-pore zeolite has a framework structure selected from the group consisting of AEI, AFT, AFV, AFX, AVL, CHA, EMT, GME, KFI, LEV, LTN, and SFW, including mixtures of two or more thereof. It is particularly preferred that the zeolite has a CHA or AEI-type framework structure.

The zeolite may be in its H+-form or may be loaded (for example, ion-exchanged) with a metal. Copper and/or iron loading is particularly preferred. Where a metal-loaded zeolite is employed, the zeolite may have a metal-loading in the range 1 to 6 wt %, preferably 3-5.5 wt % and most preferably about 4 wt %.

These sorbent materials are used to accumulate the material to be stored under normal flow conditions but when heated release the stored material. In this way the ammonia is concentrated on the solid storage material before being released into the gas phase in a more concentrated form.

The ammonia storage material may preferably be disposed on a suitable substrate such as a honeycomb monolith, a corrugated substrate (such as corrugated glass-paper or quartz fibre sheet), or a plate. Alternatively, the sorbent material (storage material) itself may be extruded in the form of a monolith or in the form of pellets or beads. For example, the sorbent material may comprise a packed bed of sorbent bead material. The nature of the sorbent material will depend on the backpressure requirements of the system.

Most preferably the ammonia storage material comprises one or more zeolites or activated carbon. Preferably the sorbent material comprises a mixture of two or more zeolites. These may be provided in a zoned configuration with different zeolites in different regions of the storage material.

In one embodiment the ammonia storage material may be provided with a material suitable for the storage of volatile organic compounds (VOC) and/or a material suitable for the storage of methane. The storage and treatment of VOCs and/or methane may allow for the odour of a livestock house to be ameliorated, as well as avoiding any associated health risks.

Volatile organic compounds and methane can also be present in livestock house environments, either released from the animals or their environment (including feed and bedding). VOCs are defined by the WHO, as cited in ISO 16000-6, as any organic compound whose boiling point is in the range from (50° C. to 100° C.) to (240° C. to 260° C.), corresponding to having saturation vapour pressures at 25° C. greater than 102 kPa. VOCs include alcohols, aldehydes, amines, esters, ethers, hydrocarbons (up to about C10), ketones, nitrogen-containing compounds, phenols, indoles and other aromatic compounds, terpens and sulphur containing compounds. These are discussed in "characterisation of odour released during handling of swine slurry: Part I. Relationship between odorants and perceived odour concentrations" Blanes-Vidal et. al. Atmospheric Environment 43 (2009) 2997-3005, incorporated herein by reference.

The material suitable for the storage of volatile organic compounds (VOC) may be the same material for the storage of ammonia, or a further material may be provided which has better storage performance for VOCs than ammonia. For example, a suitable material for the storage of a VOC would be a medium or large pore zeolite. Therefore, a mixture (in a mixed, zoned or layered configuration) of a small pore zeolite (for ammonia) and a medium/large pore zeolite (for VOCs) could be provided. Examples of preferred large pore zeolites include zeolite Y and Beta. In such embodiments the VOCs will be released at the same time and decomposed with the same oxidation catalyst. This may require higher catalyst temperatures than for ammonia alone.

Accordingly, in a preferred embodiment the ammonia storage material is provided together with a VOC storage material, wherein the ammonia storage material comprises a small pore zeolite and wherein the VOC storage material comprises a medium or large pore zeolite. Preferably the ammonia storage material and the VOC storage material are provided as a mixture, or in distinct zones, or in layers. For zoned configurations one material will be upstream of the other.

The material suitable for the storage of methane may comprise a metal organic framework material. The ammonia storage material may be provided together with a methane storage material and/or a VOC storage material.

The system comprises an ammonia oxidation catalyst arranged downstream of the selected portion of the ammonia storage material (i.e. downstream of the portion of the ammonia storage material which receives heated gas to cause desorption of ammonia). Materials known for use in ammonia oxidation catalysts are well known and would be suitable here. The catalyst may comprise one or more PGMs, for example and may have a layered or zoned configuration. Zoned and layered embodiments (preferably on a single substrate) may be preferred if a separate catalyst is desired to treat VOCs from the catalyst needed to treat ammonia, and/or if a separate catalyst is desired to treat methane from the catalyst needed to treat ammonia.

Consequently, the present invention is particularly effective since a catalyst as described herein may be used to convert the ammonia into essentially nitrogen gas ($N_2$) and water ($H_2O$). On the contrary, known systems such as for VOC oxidation based on UV oxidation with ozone and photolysis result in the complete oxidation of any nitrogen present in the exhaust stream which leads to the generation of harmful nitrogen oxides ($NO_x$) which is advantageously avoided using the present system.

Accordingly, it is preferred that the exhaust system does not comprise a photo reactor, a means for generating UV light or a means for generating ozone. It follows that the method preferably does not comprise photolysis or ozonolysis (i.e. suppling ozone for the oxidation of the species).

The system comprises a heating device for heating gas before it passes through the selected portion of the ammonia storage material to release ammonia stored therein for treatment on the ammonia oxidation catalyst. There are a number of specific configurations of heater discussed below, but the primary consideration is that the heater should provide a flow of hot gas to pass through the ammonia storage material and release the accumulated ammonia. The heater is configured to heat only gas going through a selected portion, so only the ammonia on that portion is released. That is, exhaust gas which does not pass through the selected portion of the ammonia storage material is not heated by the heater and therefore remains at ambient temperature. This means that a significant amount of ammonia can be released at a higher concentration in the flow of heated gas through the ammonia storage material. This increases the efficiency of the treatment.

One benefit of the invention is that the releasable storage achieved in the ammonia storage material permits concentration of the ammonia. Preferably the concentration of the ammonia passed to the catalyst is at least 2 times greater than the initial exhaust gas, preferably at least 5 times and more preferably at least 10 times greater, still more preferably at least 20 times greater. In embodiments which store ammonia and VOCs, these will also be released simultaneously.

The selected portion of the ammonia storage material will preferably be at most 50% of the ammonia storage material. However, preferably the selected portion will be from 1 to 15%, preferably 5 to 10% of the ammonia storage material. When the ammonia storage material is a rotating sorbent bed as discussed below, the selected portion will be a sector extending from the central axis. The size of the selected portion determines the proportion of the ammonia storage material which is discharging ammonia and the portion which is charging; preferably there is at least 5 times more of the ammonia storage material charging than discharging.

Preferably the heating device is configured to heat the gas before it passes through the selected portion of the ammonia storage material to a temperature of from 50 to 300° C., preferably 100 to 250° C. and most preferably 150 to 200° C. The target temperature will depend on the heat needed to release stored ammonia from the downstream ammonia storage material.

The heater is intended to heat only the selected portion so that the remainder of the ammonia storage material can continue to accrue ammonia from the gas flow. The air which is being heated may be obtained from the exhaust gas inlet, from a recycled air duct as discussed below, or from fresh air taken from a fresh air inlet. There are advantages to drawing in fresh air since this avoids contacting contaminants with the source of heat. For example, if an electrical induction heater is used, this can become degraded with airborne contaminants during use.

In one configuration of the heating device, it is located between the exhaust gas inlet and the ammonia storage material. A simplest configuration would therefore be the provision of a resistive heater coil arranged to heat a flow of passing gas, with the coil arranged to only heat the gas passing on to the selected portion. Such a heater can be electrical as mentioned above, or based on combustion of a fuel. Preferably the heater is a gas burner, preferably a propane, natural gas or biogas burner. These are useful especially for locations such as livestock houses, since there tend to be available supplies of propane and the like on such sites. In one embodiment, propane may be supplied with gas recycled from an outlet downstream of the ammonia oxidation catalyst as an oxygen source for combustion. Such an afterburner serves to further purify the gas being treated.

In another configuration the heating device may be located between the ammonia storage material and the ammonia oxidation catalyst and wherein the system further comprises a duct for recycling at least a portion of the gas treated on the ammonia oxidation catalyst to upstream of the selected portion of the ammonia storage material. That is, the system can recycle some of the gas passing out of the ammonia oxidation catalyst to a position upstream of the selected portion of the ammonia storage material to provide the heated flow of gas.

Alternatively, the heating device may be a heat exchanger arranged to recover heat from gas downstream of the ammonia oxidation catalyst. In this embodiment the gas passing out of the ammonia oxidation catalyst is not physically recycled, but it has its heat recovered by the heat exchanger and is used to heat a portion of gas passing to the selected portion of the ammonia storage material. By using such a heat exchanger, the inventors have found that a further heater upstream of the selected portion of the ammonia storage material is not required such that, preferably, there is no further heater upstream of the selected portion of the ammonia storage material. Nevertheless, it may be preferable that a second heating device is located between the ammonia storage material and the ammonia oxidation catalyst and is configured to heat gas passing to the ammonia oxidation catalyst to 200 to 300° C.

The system is configured so that the selected portion of the ammonia storage material changes over time. This means that there is one portion of the ammonia storage material which is being discharged of ammonia, while a remainder (one or more further portions) of the ammonia storage material is being charged with ammonia. Since the selected portion changes over time, each portion will have a first time period when it is charging with ammonia and a second time period when it is discharging the ammonia.

It should of course be appreciated that the above configuration is contemplated for the system when in operation, whereas during start-up or under certain conditions it may be required that all of the ammonia storage material is storing the ammonia (i.e. the heater is not being used to heat gas passing to the selected portion) so that there is a sufficient quantity to be treated.

Various configurations of the system can be envisioned whereby the selected portion of the ammonia storage material changes over time. In each instance the selected portion needs to move relative to the supply of heated gas and relative to the ammonia oxidation catalyst arranged downstream of the selected portion of the ammonia storage material (both of which must move together so that the heated gas desorbs ammonia from the storage material which is then treated by the catalyst). Given the complexity of the ducting and the simplicity of the ammonia storage material (such as a sorbent bed), it will generally be most appropriate to move the ammonia storage material.

A particularly preferred arrangement to allow for the selected portion of the ammonia storage material to change over time is for the ammonia storage material to be configured as a rotating sorbent bed. That is, preferably the ammonia storage material is provided within a sorbent bed which is arranged to rotate so that, in use, different portions of the ammonia storage material are each contacted with a heated gas in turn.

For a rotating sorbent bed, the bed can preferably be configured to rotate continuously at a constant rate. Alternatively, the bed can be configured to rotate stepwise at pre-set, preferably uniform, intervals (a "revolver cylinder" type configuration). Continuous rotation is preferred since this avoids any step in the ammonia release and oxidation and since this reduces wear on the system components. Typical rotation rates, in either rotation configuration, will be in the region of 0.5 to 4 rotations per hour, preferably about 1 rotation per hour. A suitable rotation rate will depend on the ammonia levels in the exhaust gas and the size of the bed and can be tuned to the specific application. A primary consideration is that the wheel needs to rotate at a sufficiently slow rate such that it cools for effective storage of ammonia before it is heated again for ammonia release. Indeed, the rotation rate can be changed on the fly responsive to ammonia levels in the exhaust gas. For example, at night when ammonia levels from a livestock house will typically decline, the wheel can rotate more slowly, speeding up in the day when the system can benefit from solar power, for example. The heater can also be turned off for a period to allow ammonia levels to increase in the storage material if required.

Preferably the system further comprises one or more ammonia sensors downstream of the remainder of the ammonia storage material, i.e. not downstream of the selected portion, to determine an ammonia loading status. This can be used to control the rotation rate to ensure that ammonia storage material is discharged before it becomes over full. By the term "ammonia sensor" it is meant any sensor that is capable of providing an indication of ammonia loading levels. A preferred sensor is an automotive $NO_x$ sensor since these are not expensive and cannot distinguish between $NH_3$ and $NO_x$ (i.e. where only $NH_3$ is present the output of the $NO_x$ sensor gives an indication of $NH_3$ levels). Such sensors are well known in the art.

For a rotating sorbent bed the preferred bed size is such that it has a diameter of from 10 cm to 600 cm, preferably 100 to 450 cm, more preferably 200 to 400 cm, for example 300 cm. Preferably, the sorbent bed has a depth of 5 to 50 cm, preferably 10 to 20 cm. As will be appreciated, the rotating beds can therefore have a significant ammonia storage capacity. The size of the wheel can be scaled down or up depending on a number of factors, for example, the quantity of ammonia (larger animals will generate higher quantities) and the back-pressure generated (which itself will be dependent on a variety of factors, e.g. sorbent depth, fan size). The main factor in the wheel size is the pressure-drop requirements, with larger wheel sizes permitting lower pressure drop requirements, meaning less powerful driving fans are required with an associated lower energy cost, A wheel size of 2-4 m can permit a pressure drop as low as 2 mbar or even 1 mbar.

Gas flow rates through the system would be expected to peak in the region of 100 to 300 $km^3/h$, such as about 200 $km^3/h$, with faster rates required in summer than in winter.

As can be appreciated from a rotating sorbent bed, the bed will have a portion receiving the ambient air from the, for example, a poultry house, at an ambient temperature. This portion of the bed will be efficiently storing ammonia. The selected portion receiving heated gas will be at an elevated temperature as mentioned above, such as 150° C. However, a portion which has just been rotated away from the source of heated gas will take time to cool to ambient temperature. During this period there is an increased risk of ammonia slip.

Preferably, the system comprises means for cooling a previously-heated portion of the ammonia storage material with a supply of ambient air. The ambient air may be ambient exhaust gas, for example from the livestock house. In some embodiments, it is preferred that the ambient air is ambient fresh air. In a particularly preferred embodiment, the supply of ambient air can be coupled with a heat exchanger to allow use of the heat being recovered elsewhere in the system. That is, heat from the previously-heated portion of the ammonia storage material may be recovered through the use of an ambient air flow which is then further heated, preferably using a heat exchanger arranged to recover heat from gas downstream of the ammonia oxidation catalyst as described herein, so as to provide the heated gas (i.e. a separate gas stream) which passes through the selected portion of the ammonia storage material. Preferably the previously-heated portion of the ammonia storage material is cooled with a flow counter to the normal direction of gases through the ammonia storage material. This means that the gas flow avoids any ammonia slip, since any ammonia is carried back upstream of the cooling ammonia storage material and is either retained on ambient temperature ammonia storage material, or passes through the selected portion as a heated gas (depending on the configuration).

Equally, a portion of the sorbent bed that is soon to be the selected portion can be preheated to be brought up to temperature. This can advantageously be achieved by diverting a residual flow of heated gas through this portion of the sorbent bed or by using a heat-exchanger to pre-heat using secondary heat sources elsewhere in the process. Preferably the system comprises means for ducting gas from a previously-heated portion of the ammonia storage material to pre-heat a soon-to-be heated portion of the ammonia storage material. Gases leaving the soon-to-be-heated portion of the ammonia storage material may slip ammonia, so desirably this gas is then heated further (heater or heat exchanger) and ducted upstream of the selected portion to provide the required flow of heated gas. Such pre-heating has been found to provide an effective means for recycling heat within the exhaust system and improving overall efficiency. For example, heat is recycled from the previously-heated portion to the soon-to-be heated portion of the ammonia storage material and the gas used to transfer such heat, together with any residual heat after pre-heating the soon-to-be-treated portion and ammonia slip, may then be heated via a heat exchanger arranged to recover heat from gas downstream of the ammonia oxidation catalyst. As described herein, the heated gas is then passed through the selected portion of the ammonia storage material.

The rotating sorbent bed can comprise a plurality of inserts comprising the ammonia storage material. This means that suitable ammonia storage materials that can be employed are those of the types known from the automotive industry, saving in cost and complexity. In such an embodiment the plurality of inserts would be releasably held in a supporting frame structure so as to provide storage material for the exhaust gas to pass through while minimising any gas bypassing the storage material.

Preferably the system further comprises one or more material filters between the exhaust gas inlet and the ammonia storage material. That is, the system comprises filters to perform an initial screen of matter which could affect the performance of the downstream exhaust system. When treating air from a poultry house, such a material filter can be used to remove entrained feathers, fluff, straw, dust and the like.

Preferably the system comprises an $H_2S$ sorbent material and/or an arsenic sorbent material upstream of the ammonia storage material. Sulphur or arsenic poisoning of the ammonia storage material or the ammonia oxidation catalyst would lead to a drop in system performance, so it is desirable to separately capture this upstream within the system. Preferably the system further comprises one or more sorbent materials for further contaminants upstream of the plurality of sorbent beds, wherein the further contaminant is selected from one or more of $SO_2$, $SO_3$, Hg and Cl. By Hg and Cl it is meant any suitable mercury-containing and chlorine-containing species, respectively. Such contaminants are desirably removed in order to ensure that the one or more catalysts are not poisoned.

As noted above, the ammonia storage material will be selected to store ammonia at the ambient temperature of the received exhaust gas. In order to release the ammonia stored in the ammonia storage material the temperature of the gas passing through the selected portion of the ammonia storage material is increased. A suitable temperature for stimulating the ammonia release may be in the region of about 150° C. as discussed above. However, this may not be the optimal temperature for the operation of the ammonia oxidation catalyst. Accordingly, the system may further comprise a second heating device located between the ammonia storage material and the ammonia oxidation catalyst and, preferably the second heating device is configured to heat gas passing to the ammonia oxidation catalyst to 200 to 300° C.

This is particularly advantageous because the oxidation of the ammonia is itself exothermic. Accordingly, the second heater may only be required intermittently to activate the ammonia oxidation catalyst when it cools below an optimal operating temperature. It is more efficient to adopt this approach, rather than simply heating all of the gas passing through the selected portion of the ammonia storage material to the temperature required by the catalyst, since the ammonia can be released at a much lower temperature.

One or more of the filters, sorbent beds or catalysts described herein may comprise copper. Copper is known to have an antiviral effect. Thus, the presence of the copper in the system to contact the exhaust gas may have an antiviral effect which could reduce transmission of viruses via the exhaust gas. For example, a zeolite included in the ammonia storage material (or the VOC storage material where present) may comprise copper. Such copper may be loaded by ion exchange onto the zeolite. Preferably the copper-loading of the zeolite is in the range from 1 to 6 wt % of the zeolite.

According to a further aspect there is provided a complete system comprising both the source of the exhaust gas system to be treated and the exhaust system as described herein. According to a further aspect there is provided a livestock house comprising the exhaust-gas system as described herein.

According to a further aspect there is provided a method of treating an ammonia-containing exhaust gas, the method comprising passing the ammonia-containing exhaust gas through the exhaust-gas system as described herein.

The invention will now be described in relation to the following non-limiting figures, in which.

Figure 1:
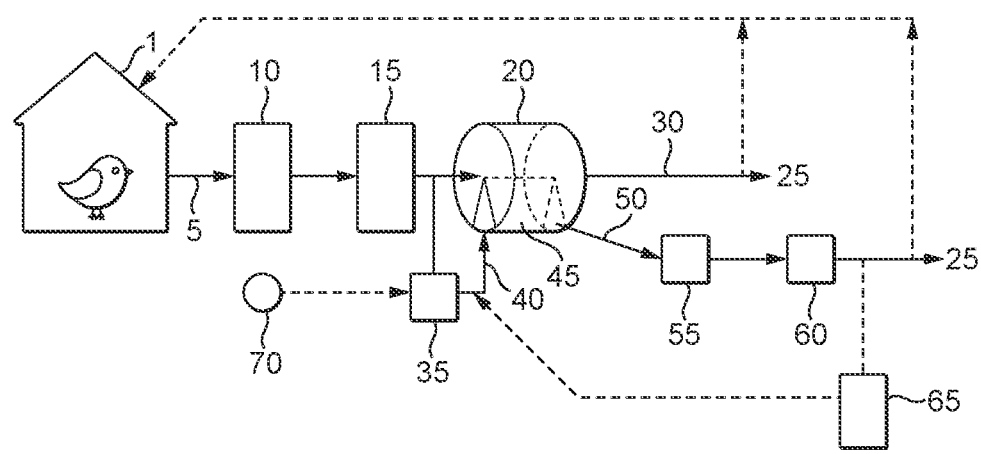
FIG. 1 shows a schematic of an exhaust gas system as described herein.

FIG. 1 shows a poultry house 1 provided with an exhaust gas system as described herein. The poultry house 1 provides a source of exhaust gas 5 which will typically contain about 20 ppm of ammonia. The exhaust gas 5 is passed to a material filter 10 to ensure that any undesirable physical contaminants, such as poultry feathers are removed. The exhaust gas 5 then passes to an $H_2S$ sorbent 15 to ensure that $H_2S$ is removed and does not poison the downstream components of the system.

The exhaust gas 5 then passes to a sorbent wheel 20 which comprises ammonia storage material. The majority of the exhaust gas 5 passes directly out of the sorbent wheel 20 to the atmosphere 25 as an ammonia-depleted exhaust gas 30, with the ammonia having been stored on the ammonia storage material. The ammonia-depleted exhaust gas 30 typically comprises less than 1 ppm ammonia and preferably essentially no ammonia. A minority of the exhaust gas 5 passes through a heater 35, such as a propane burner or a resistive heater coil, to provide a heated exhaust gas 40 (around 150° C.).

The heated exhaust gas 40 passes through a selected portion 45 of the sorbent wheel 20. Because of the heated exhaust gas 40, ammonia absorbed on the sorbent wheel 20 is desorbed. This forms an ammonia-rich gas 50 containing at least 250 ppm ammonia and preferably at least 1000 ppm ammonia. The ammonia-rich gas 50 leaving the selected portion 45 of the sorbent wheel 20 is directed to a further heater 55 and then to an oxidation catalyst 60 for decomposing the ammonia to nitrogen and water before this is released to the atmosphere 25 with levels of ammonia of less than 1 ppm and preferably essentially no ammonia.

The gases released to the atmosphere 25 may instead be returned to the poultry house 1, This allows the heat to be retained in the atmosphere when the ambient temperature in the poultry house 1 is below the outside ambient temperature, reducing heating costs.

Instead or in addition to the heater 35, a heat exchanger 65 can be used to provide the heated exhaust gas 40. Instead or in addition to using a minority of the exhaust gas 5 to desorb the ammonia, a source of fresh gas 70, such as fresh air, can be used.

Gas recycle routes and some alternatives or optional features/are shown with dashed lines.

Figure 2:
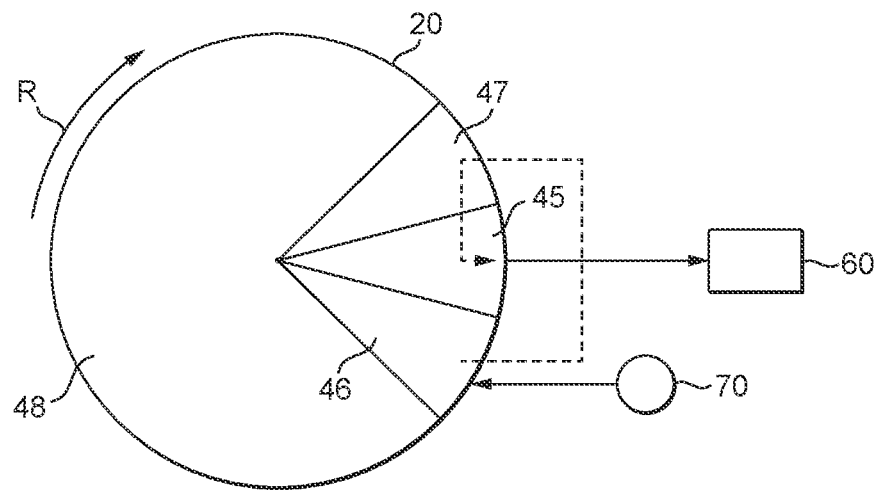
FIG. 2 shows a schematic of a sorbent bed wheel as described herein.

FIG. 2 shows a sorbent wheel 20 and in particular the selected portion 45 which receives the minority of heated exhaust gas 40. As further shown, due to the direction of rotation (R) there will also be a cooling portion 46 and there may be a pre-heating portion 47.

In order to minimise ammonia slip, the cooling portion 46 is desirably cooled with a source of fresh air 70, optionally flowing in a counter-current direction. After passing through the cooling portion 46 the gas may then be allowed to pass freely through the selected portion 45, the pre-heating portion 47 or the remainder portion 48. Alternatively the gas can be directed specifically to the pre-heating portion 47 for energy efficiency. After passing through the pre-heating portion 47, the gases can be further heated with the heat exchanger 65 to then be ducted upstream of the selected portion 45 to provide hot gas for desorbing ammonia. All of this gas flow can be controlled with suitable ducting and, where necessary with driving fans.

Although preferred embodiments of the invention have been described herein in detail, it will be understood by those skilled in the art that variations may be made thereto without departing from the scope of the invention or of the appended claims.

The invention claimed is:

1. A livestock house comprising an exhaust system for the treatment of an exhaust gas comprising ammonia in an amount of up to 250 ppm, the exhaust system comprising:
   an exhaust gas inlet;
   an ammonia storage material arranged to receive an exhaust gas from the exhaust gas inlet and produce an ammonia-rich gas containing at least 250 ppm ammonia;
   an $H_2S$ sorbent material upstream of the ammonia storage material;
   an ammonia oxidation catalyst arranged downstream of a selected portion of the ammonia storage material, the ammonia oxidation catalyst comprising one or more platinum group metals (PGMs) and being configured for oxidation of the ammonia-rich gas from the ammonia storage material; and
   a heating device for heating gas before it passes through the selected portion of the ammonia storage material to release ammonia from the exhaust gas stored therein for treatment on the ammonia oxidation catalyst,
   wherein the system is configured so that the selected portion of the ammonia storage material changes over time.

2. The livestock house according to claim 1, wherein the exhaust gas comprises from 1 to 50 ppm ammonia.

3. The livestock house according to claim 1, wherein the exhaust gas comprises from 10 to 25 ppm ammonia.

4. The livestock house according to claim 1, wherein the heating device is configured to heat the gas before it passes through the selected portion of the ammonia storage material to a temperature of from 50 to 300° C.

5. The livestock house according to claim 1, wherein the heating device is configured to heat the gas before it passes through the selected portion of the ammonia storage material to a temperature of from 100 to 250° C.

6. The livestock house according to claim 1, wherein the heating device is configured to heat the gas before it passes through the selected portion of the ammonia storage material to a temperature of from 150 to 200° C.

7. The livestock house according to claim 1, wherein the exhaust system further comprises one or more material filters between the exhaust gas inlet and the ammonia storage material.

8. The livestock house according to claim 1, wherein the exhaust system further comprises an As sorbent material upstream of the ammonia storage material.

9. The livestock house according to claim 1, the exhaust system comprising means for cooling a previously-heated portion of the ammonia storage material with a supply of ambient air.

10. The livestock house according to claim 1, wherein the system comprises means for ducting gas from a previously-heated portion of the ammonia storage material to pre-heat a soon-to-be heated portion of the ammonia storage material.

11. The livestock house according to claim 1, wherein the ammonia storage material is provided within a sorbent bed which is arranged to rotate so that, in use, portions of the ammonia storage material are each contacted with a heated gas in turn.

12. The livestock house according to claim 11, wherein the sorbent bed is configured to rotate continuously at a constant rate.

13. The livestock house according to claim 11, wherein the sorbent bed is configured to rotate stepwise at uniform intervals.

14. The livestock house according to claim 11, wherein the sorbent bed has a diameter of 10 cm to 600 cm.

15. The livestock house according to claim 11, wherein the sorbent bed has a diameter of 50 to 300 cm.

16. The livestock house according to claim 11, wherein the sorbent bed has a diameter of 100 to 200 cm.

17. The livestock house according to claim 11, wherein the sorbent bed has a depth of 5-50 cm.

18. The livestock house according to claim 11, wherein the sorbent bed has a depth of 10-20 cm.

19. The livestock house according to claim 11, wherein the sorbent bed comprises a plurality of inserts comprising the ammonia storage material.

20. The livestock house according to claim 1, wherein the heating device is located between the exhaust gas inlet and the ammonia storage material.

21. The livestock house according to claim 1, wherein the heating device is located between the ammonia storage material and the ammonia oxidation catalyst and wherein the system further comprises a duct for recycling at least a portion of the gas from the ammonia oxidation catalyst upstream of the selected portion of the ammonia storage material.

22. The livestock house according to claim 1, wherein the heating device is a heat exchanger arranged to recover heat from gas downstream of the ammonia oxidation catalyst.

23. The livestock house according to claim 22, further comprising a second heating device located between the ammonia storage material and the ammonia oxidation catalyst, wherein the second heating device is configured to heat gas passing to the ammonia oxidation catalyst to 200 to 300° C.

24. The livestock house according to claim 1, wherein the ammonia oxidation catalyst comprises a zoned or layered configuration.

25. The livestock house according to claim 24, wherein the ammonia oxidation catalyst comprises a zoned or layered configuration on a single substrate.

26. The livestock house according to claim 1, further comprising a second heater for receiving and heating the ammonia-rich gas produced by the ammonia storage material, and wherein the system is configured such that the ammonia-rich gas flows directly from the ammonia storage material to the second heater, and then directly from the second heater to the ammonia oxidation catalyst.

\* \* \* \* \*